US012612182B2

(12) United States Patent
Myren

(10) Patent No.: US 12,612,182 B2
(45) Date of Patent: Apr. 28, 2026

(54) TUNED FLIGHT LANGUAGE MODEL FOR COGNITIVE WORKLOAD

(71) Applicant: Rockwell Collins, Inc., Cedar Rapids, IA (US)

(72) Inventor: Jason A Myren, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 52 days.

(21) Appl. No.: 18/614,185

(22) Filed: Mar. 22, 2024

(65) Prior Publication Data

US 2025/0296699 A1 Sep. 25, 2025

(51) Int. Cl.
| *B64D 47/02* | (2006.01) |
| *B64D 45/00* | (2006.01) |
| *B64D 47/08* | (2006.01) |

(52) U.S. Cl.
CPC ............. *B64D 47/02* (2013.01); *B64D 45/00* (2013.01); *B64D 47/08* (2013.01)

(58) Field of Classification Search
USPC .......................................................... 701/3
See application file for complete search history.

(56) References Cited

U.S. PATENT DOCUMENTS

| 10,232,953 | B2 | 3/2019 | Cornell et al. |
| 10,543,931 | B2 | 1/2020 | Saptharishi et al. |

| 11,688,390 | B2 | 6/2023 | Nama et al. | |
| 11,783,810 | B2 | 10/2023 | Dame et al. | |
| 11,783,817 | B2 | 10/2023 | Tkaczyk et al. | |
| 11,787,062 | B2 * | 10/2023 | Klemisch ............. | A61B 5/6813 |
| | | | | 340/576 |
| 2021/0233411 | A1 | 7/2021 | Saptharishi et al. | |
| 2023/0057709 | A1 | 2/2023 | Naiman et al. | |

FOREIGN PATENT DOCUMENTS

| EP | 4099289 | A1 | 12/2022 |
| EP | 4220604 | A2 | 8/2023 |
| EP | 4223646 | A1 | 8/2023 |

OTHER PUBLICATIONS

Extended European Search Report for European Patent Application No. 25152374.2, dated May 30, 2025, 9 pages.

* cited by examiner

*Primary Examiner* — Adam D Tissot
(74) *Attorney, Agent, or Firm* — Kinney & Lange, P.A.

(57) ABSTRACT

A pilot notification system includes multiple sensors, multiple modules, and a large language model (LLM). The modules processes inputs to determine the cognitive state of the pilot, the current pilot workload, and the current flight conditions of the aircraft. These modules send this information to other modules which process this information and send the information to the LLM. The structure of the LLM is modified to reflect the pilot's current cognitive state, the pilot's current workload, and the current flight conditions. The LLM generates a pilot alert message to alert the pilot of import information while considering the current circumstances.

20 Claims, 6 Drawing Sheets

Pilot observation sensor receives pilot observation sensor input from observing pilot Pilot observation sensor outputs the pilot observation sensor input to the pilot cognitive state module Pilot cognitive state module analyzes the pilot observation sensor input and generates a cognitive state report Pilot cognitive state module sends the cognitive state report to the LLM Tuning Controller

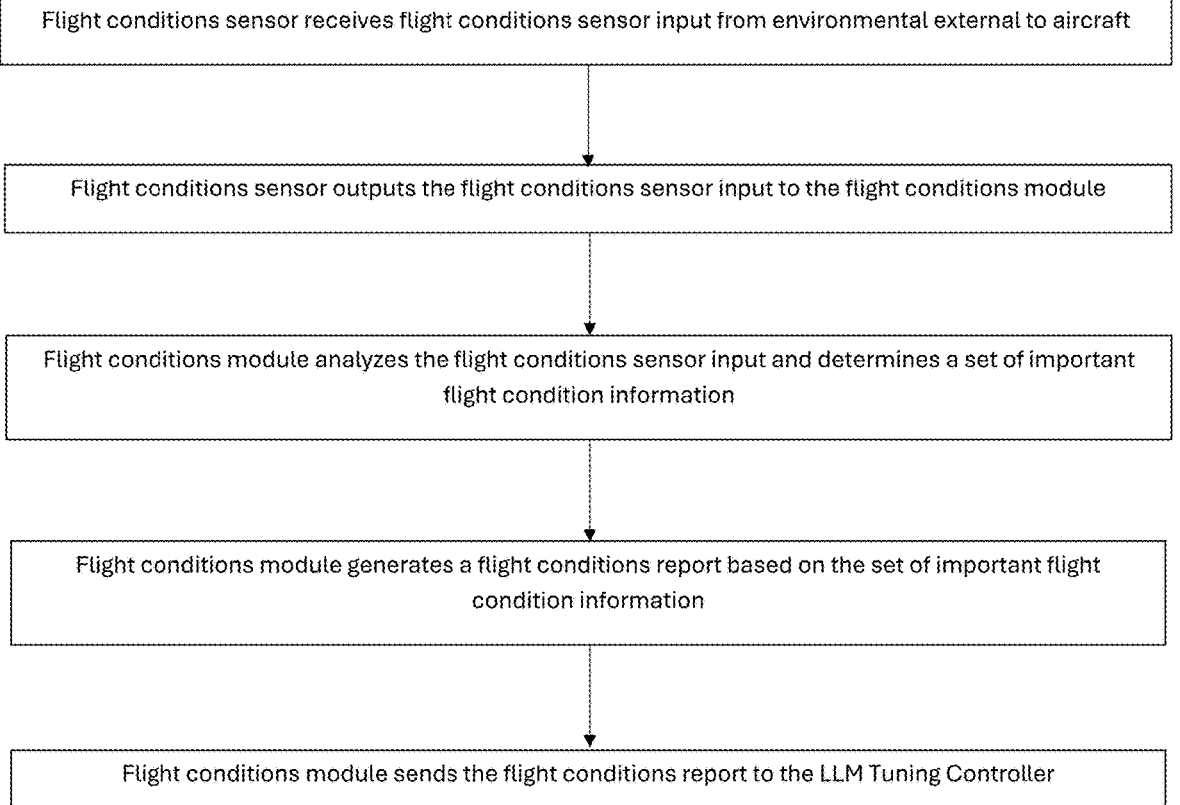

Flight conditions sensor receives flight conditions sensor input from environmental external to aircraft Flight conditions sensor outputs the flight conditions sensor input to the flight conditions module Flight conditions module analyzes the flight conditions sensor input and determines a set of important flight condition information Flight conditions module generates a flight conditions report based on the set of important flight condition information Flight conditions module sends the flight conditions report to the LLM Tuning Controller

FIG 3

Yoke 140

Toggle
aircraft
switch 142

Throttle
controller
144

Landing gear
controls 146

Flight display 114

TUNED FLIGHT LANGUAGE MODEL FOR COGNITIVE WORKLOAD

BACKGROUND

The present disclosure relates generally to a pilot notification system and, more particularly, to a pilot notification system designed for a single-pilot cockpit.

The aviation industry has a growing interest in reducing the size of the flight crews on commercial and military transport aircraft to use existing crew resources more efficiently and to reduce the costs of obtaining and training new crew members. For example, crewing commercial and military transport aircraft with a single pilot rather than two pilots could be desirable if such a reduction in crewing can be accomplished while maintaining the high safety standards expected in the industry. While such a change has some similarities to the elimination of the previously common flight engineer position, it has to account for the loss of redundancy that would accompany a reduction to a single pilot.

SUMMARY

One aspect of this disclosure is directed to a pilot notification system that includes a plurality of pilot cognitive state sensors, a plurality of pilot interface sensors, a plurality of flight conditions sensors, a pilot cognitive state module configured to receive pilot cognitive state sensor input from the plurality of pilot cognitive state sensors, a pilot workload module configured to receive pilot interface sensor input from the plurality of pilot interface sensors, a flight conditions module configured to receive flight conditions sensor input from the plurality of flight conditions sensors, a large language model (LLM) Tuning Controller, and a LLM. The pilot cognitive state module processes the pilot cognitive state sensor input to determine a cognitive state of the pilot, generates a pilot cognitive state report that reflects the cognitive state of the pilot, and transmits the pilot cognitive state report to the LLM Tuning Controller. The pilot workload module processes the pilot interface sensor input to determine pilot workload, generates a pilot workload report that reflects pilot workload, and transmits the pilot workload report to the LLM Tuning Controller. The flight conditions module processes the flight conditions sensor input to determine flight conditions of the aircraft, generates a flight conditions report, and transmit the flight conditions report to the LLM Tuning Controller. The LLM Tuning Controller includes a LLM Tuner Module and a Tuning Controller Alert Module. The LLM Tuning Controller is configured to receive the pilot cognitive state report, the pilot workload report, and the flight conditions report. The LLM Tuning Controller causes the LLM Tuner Module to generate a set of tuning modifications based on the pilot cognitive state report, the pilot workload report, and the flight conditions report. The set of tuning modifications cause the LLM Tuner Module to modify the current structure of the LLM to reflect the pilot cognitive state report, the pilot workload report, and the flight conditions report. The LLM Tuning Controller is further configured to cause the Tuning Controller Alert Module to generate a tuning controller alert based on at least one of the pilot cognitive state report, the pilot workload report, the flight conditions report and transmit the tuning controller alert to the LLM. The LLM is configured to receive the tuning controller alert, generates a pilot alert message based on the tuning controller alert, and transmits the pilot alert message to a pilot communications module to present the pilot alert message to a pilot. The LLM generates the pilot alert message using the tuning controller alert and an artificial intelligence algorithm that resides in the LLM. The artificial intelligence algorithm has been adjusted using the set of tuning modifications.

Another aspect of this disclosure is directed to a method of operating a pilot notification system that includes receiving a pilot observation sensor input to a pilot observation sensor configured to collect data about a pilot from observing the pilot, transmitting the pilot observation sensor input to a pilot cognitive state module, analyzing the pilot observation sensor input using the pilot cognitive state module to generate a pilot cognitive state report that summarizes the cognitive state of the pilot, transmitting the pilot cognitive state report from the pilot cognitive state module to a large language model (LLM) Tuning Controller, receiving a flight conditions sensor input to a flight conditions sensor configured to collect data about the environment external to the aircraft and data about the flight conditions of an aircraft, transmitting the flight conditions sensor input to a flight conditions module configured to analyze the flight condition input to determine a set of important flight condition information, analyzing the flight conditions sensor input using the flight conditions module to determine the set of important flight condition information and generate a flight conditions report using the set of important flight condition information, transmitting the flight conditions report from the flight conditions module to the LLM Tuning Controller, receiving the pilot cognitive state report and the flight conditions report in the LLM Tuning Controller, generating a set of tuning modifications in the LLM Tuner Module based on the pilot cognitive state report and the flight conditions report, generating a tuning controller alert in the Tuning Alert Module based on at least one of the pilot cognitive state report or the flight conditions report, transmitting the tuning controller alert from the Tuning Alert Module to the LLM, receiving the tuning controller alert in the LLM, generating a message in the LLM using the tuning controller alert and an artificial intelligence algorithm, transmitting the message from the LLM to a pilot communications module, and displaying the message to a pilot using the pilot communications module. The pilot observation sensor input is any input to the pilot observation sensor. The pilot cognitive state module is a computer program configured to analyze the pilot observation sensor input to determine a cognitive state of the pilot. The pilot's cognitive state includes a mental state of the pilot. The pilot cognitive state report includes a first signal to notify the pilot of the pilot cognitive state report. The flight conditions sensor input is any input to the flight conditions sensor. The flight conditions report includes a second signal to notify the pilot of the flight condition report. The set of tuning modifications cause the LLM Tuner Module to modify the current structure of the LLM to reflect the pilot cognitive state report and the flight conditions report. The artificial intelligence algorithm has been adjusted using the set of tuning instructions.

BRIEF DESCRIPTION OF THE DRAWINGS

FIG. 3 is a schematic diagram of a flight conditions module.

DETAILED DESCRIPTION

The present disclosure is directed to a method and apparatus for operating a pilot notification system that uses artificial intelligence (AI) to increase the effectiveness of communicating with a pilot by considering the current circumstances such as the pilot's cognitive state, the pilot's current workload, and the current flight conditions. The disclosed method and apparatus can be used to supplement an existing two-pilot crew and can contribute to enabling a reduction of crewing to a single pilot for at least some flight segments (e.g., when one pilot takes a rest break during a long flight). For purposes of simplicity, the disclosed method and apparatus will be described in the context of use by a single pilot.

Current commercial and military transport aircraft systems are designed to support two pilots, who are sometimes supplemented by training crew in the cockpit and/or back up crew onboard for long flights. These systems are typically not designed to support one pilot. Normally, flight responsibilities are divided between the two pilots. With a single pilot, the flight responsibilities are focused solely on one person. These increased responsibilities can burden a solo pilot with additional stress in comparison to a two-pilot crew. During a two-pilot flight, each pilot has another pilot to interpret messages, perform tasks, and divide the flight workload. In a solo pilot flight, the pilot has to perform all of these tasks alone. The disclosed method and apparatus operate similar to a co-pilot by supplying the pilot with necessary information to aid the pilot in making informed decisions with due consideration of the current flight circumstances and the pilot's current mental and physical state. In addition, the disclosed method and apparatus can adapt the way that the notification system communicates with the pilot to incorporate these considerations.

Figure 1A:
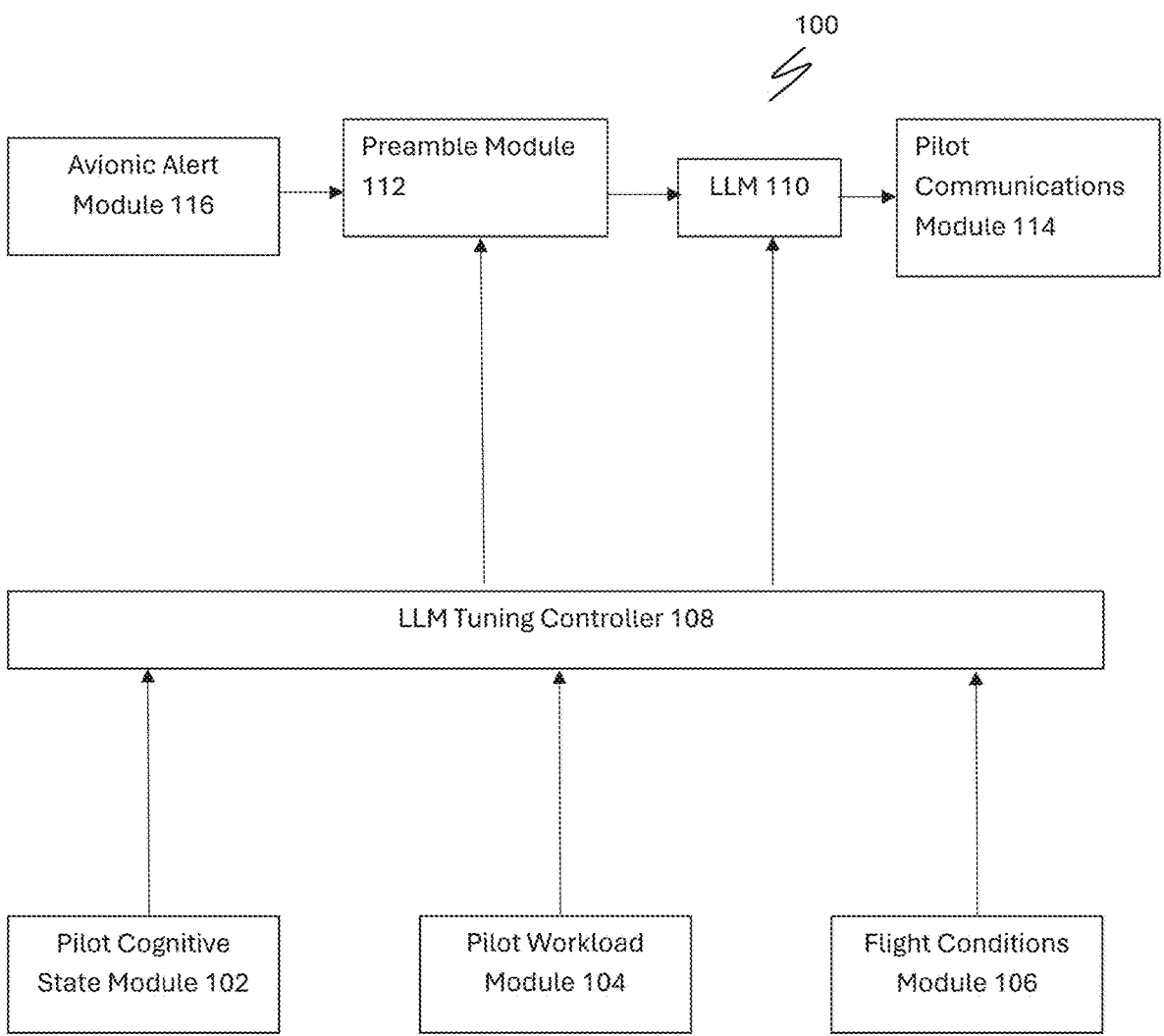
FIG. 1A is a schematic diagram of the pilot notification system.

FIG. 1A is a schematic diagram of pilot notification system 100. Pilot notification system 100 can, for example, include pilot cognitive state module 102, pilot workload module 104, flight conditions module 106, LLM tuning controller 108, LLM 110, optional preamble module 112, pilot communications module 114, which may be capable of visual and audible communications, and avionic alert module 116. Pilot notification system 100 and all of its subparts begin performing their functions from the moment the pilot enters the cockpit. Pilot notification system 100 and all of its subparts continue performing their functions throughout the entire flight, and they continue performing their functions until the pilot leaves the cockpit after the aircraft has landed.

FIG. 1A provides a high-level schematic diagram of how the major pieces within pilot notification system 100 interact with each other. Pilot notification system 100 receives inputs from various sensors into three modules: pilot cognitive state module 102, pilot workload module 104, and flight conditions module 106. These modules process the inputs and generate an output to LLM tuning controller 108. The output is a report that describes the current state of the pilot or the current flight conditions. The reports produced by the pilot cognitive state module 102, pilot workload module 104, and flight conditions module 106 may be in any format appropriate for providing input into the LLM tuning controller 108, such as digital signals, coded text, human-readable text, or any other appropriate format. LLM tuning controller 108 receives the three reports from the modules, processes the reports, and determines what the pilot's state of mind is, and how to best interact with the pilot. In one example, if the pilot does need to be alerted, then LLM tuning controller 108 sends a tuning controller alert to preamble module 112. Preamble module 112 uses the tuning controller alert to adjust the preamble of the LLM message to reflect the type of pilot message that needs to be generated (ex: a message that is more terse, a message that contains more data, including a reference in the message that follow up is desired, etc.). Simultaneously, LLM tuning controller 108 modifies a large language model (LLM) 110 within pilot notification system 100. LLM tuning controller 108 modifies LLM 110 using the three module reports to tune LLM 110 to the current state of the pilot and the current flight conditions. Then, preamble module 112 combines the tuning controller alert from LLM tuning controller 108 with a preamble from preamble module 112 to form a prompt. The prompt is then provided to LLM 110. The prompt gives LLM 110 instructions about what to communicate to the pilot. The prompt can also give LLM 110 instructions on how LLM 110 should communicate to the pilot (such as what tone of voice to use during the communication). LLM 110 uses an AI algorithm along with the adjustments provided by LLM tuning controller 108 to generate a pilot alert message. The pilot alert message generated by LLM 110 communicates the information that the pilot needs to be alerted of, while tailoring the tone and content of the message to accommodate the current state of the pilot and the current flight conditions. LLM 110 provides the pilot alert message to pilot communications module 114. Pilot communications module 114 presents the pilot alert message to the pilot. In another example discussed later, preamble module 112 can receive an alert from avionic alert module 116. In another example, preamble module 112 can receive an alert from either LLM tuning controller 108, avionic alert module 116 or both LLM tuning controller 108 and avionic alert module 116.

Figure 1B:
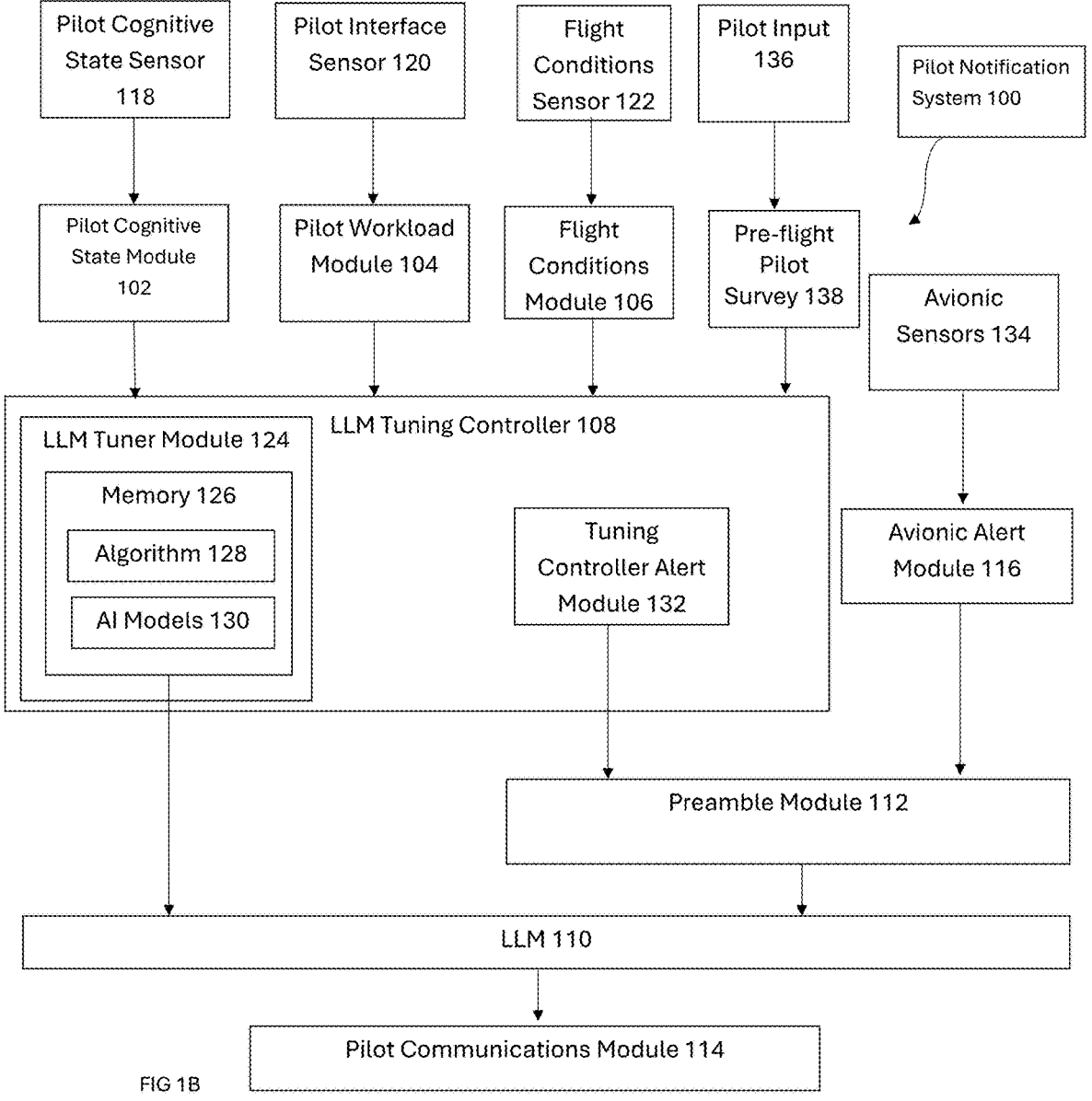
FIG. 1B is another schematic diagram of the pilot notification system.

FIG. 1B is another schematic diagram of pilot notification system 100 that includes more detail into the subparts of pilot notification system 100. Pilot notification system 100 can, for example, further include pilot cognitive state sensor 118, pilot interface sensor 120, flight conditions sensor 122, LLM tuner module 124, memory 126, algorithm 128, AI models 130, tuning controller alert module 132, avionic sensors 134, pilot input 136, and pre-flight pilot survey 138.

Figure 2:
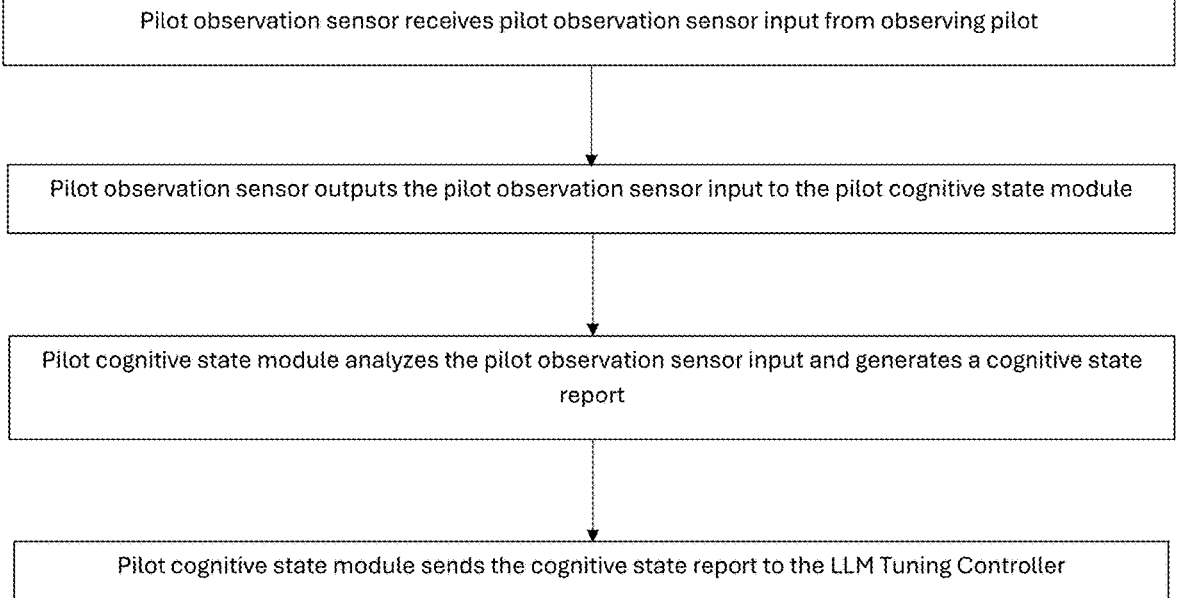
FIG. 2 is a schematic diagram of a pilot cognitive state module.

Pilot cognitive state module 102 is a program that accepts inputs from various pilot cognitive state sensors 118, processes those inputs, determines the pilot's cognitive state, generates a pilot cognitive state report, and sends the pilot cognitive state report to the LLM tuning controller (see FIG. 2 for a representation of the steps conducted by pilot cognitive state module 102). Pilot cognitive state module 102 is connected to multiple pilot cognitive state sensors 118. Pilot cognitive state sensors 118 can be any sensors that input information that can be used to determine the pilot's cognitive state. Some examples of pilot cognitive state sensors 118 are facial expression analysis sensors such as a camera that captures visual information from facial features, expressions, and movements, eye-tracking sensors can be used to detect small dynamic changes in eye movements, audio sensors capture sound patterns related to speech or emotional cues, depth sensors measure distances from the sensor to facial features which assist in handling variations in head pose and position, etc. This list is not exhaustive. Numerous other types of sensors can be used as pilot cognitive state sensors 118.

Each of pilot cognitive state sensors 118 sends information to pilot cognitive state module 102 that relates to the pilot's cognitive state. Pilot cognitive state module 102 processes the various inputs from pilot cognitive state sensors 118 and determines the pilot's cognitive state. It is beneficial to have multiple pilot cognitive state sensors 118 in pilot notification system 100, because each pilot cognitive state sensor 118 can provide a different type of measurement of the pilot's cognitive state. The pilot cognitive state module 102 can be programmed to summarize the pilot's cognitive state in various ways such as "attentive," "tired," "distracted," "asleep," etc.

Figure 4:
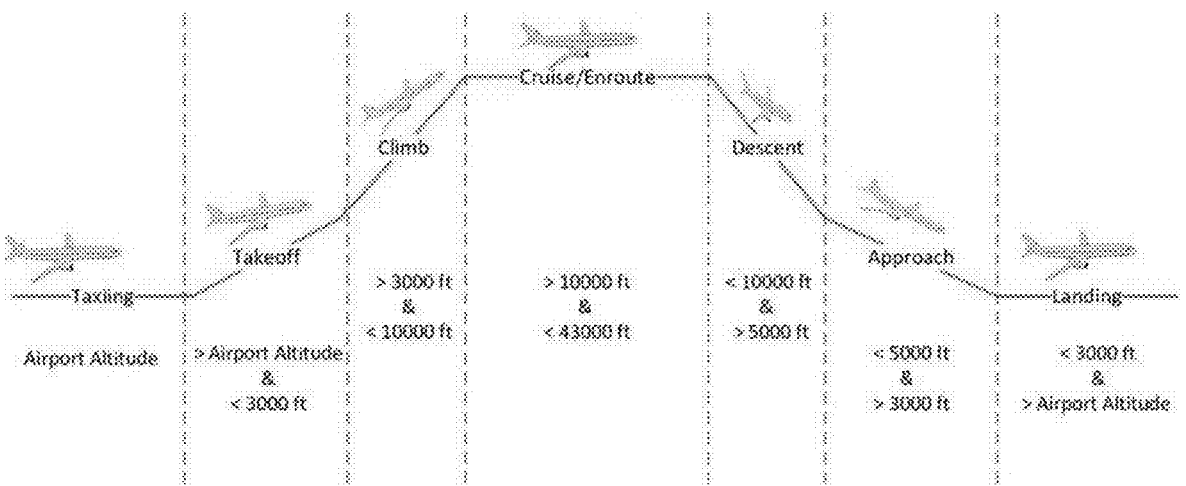
FIG. 4. is a graphic representation of representative flight segments.

Once pilot cognitive state module 102 has determined the pilot's cognitive state, pilot cognitive state module 102 generates a pilot cognitive state report and sends the pilot cognitive state report to LLM tuning controller 108. The pilot cognitive state report can summarize the pilot's cognitive state in any message length including in an abbreviation, one word, a couple of words, or several sentences. The pilot's cognitive state is important, because it is used as a consideration by the LLM tunning controller 108 to determine how to communicate information to the pilot using LLM 110. Pilot cognitive state module 102 and pilot cognitive state sensors 118 begin gathering information as soon as the pilot enters the cockpit and during the duration of the flight. If pilot cognitive state module 102 determines that the pilot's cognitive state has changed during a flight, it sends an updated pilot cognitive state report to LLM tunning controller 108. During the takeoff and the early stages of a flight, the pilot's cognitive state may be focused. However, when the aircraft enters the cruise portion of the flight, the pilot may become more relaxed, start to lose focus, and become distracted (see FIG. 4 for a representation of typical flight segments). Pilot notification system 100 communicates with the pilot differently when the pilot is in a calm, relaxed state compared to when the pilot is very focused or stressed.

Pilot cognitive state module 102 can generate an alert based on the inputs that it receives from pilot cognitive state sensors 118. If pilot cognitive state module 102 determines that there is some information that the pilot needs to be aware of, pilot cognitive state module 102 can include an alert in the pilot cognitive state report. The alert can include information that the pilot needs to be aware of and the urgency of that information. For example, pilot cognitive state module 102 can determine that the pilot is falling asleep and should be aware that they are falling asleep, send a pilot cognitive state report to LLM tuning controller 108, include an alert in the pilot cognitive state report, and indicate that the alert is urgent. Pilot notification system 100 considers the urgency of the alert when determining the appropriate method of communication with the pilot.

Figure 5:
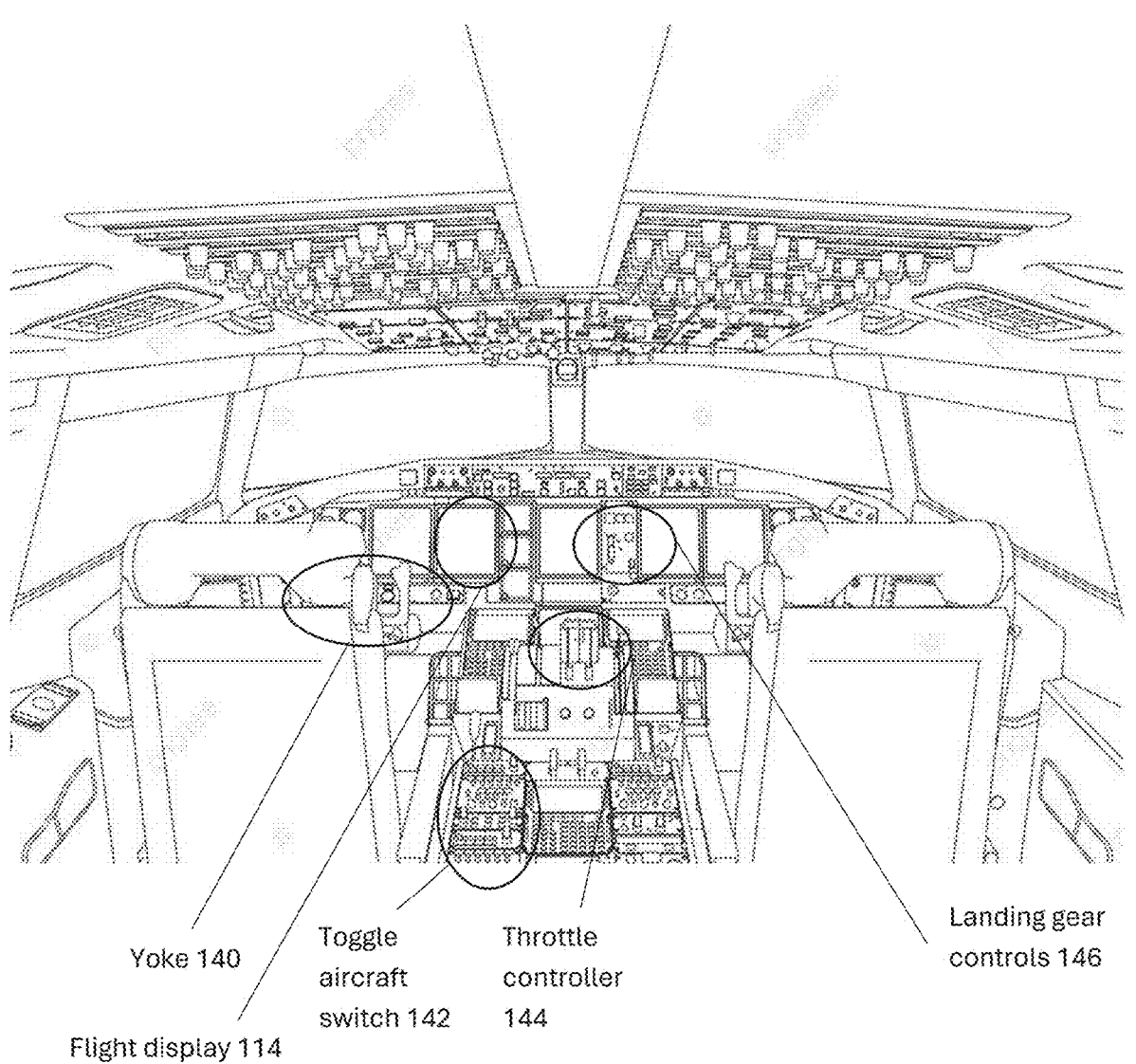
FIG. 5 is a schematic representation of a typical aircraft cockpit.

Pilot workload module 104 is a program that accepts inputs from various pilot interface sensors 120, processes those inputs, and determines the pilot's current workload based on the utilization of pilot interface sensors 120. Pilot workload module 104 is connected to various pilot interface 120. Pilot interface sensors 120 can be any sensor that inputs information about the pilot's current activities. Pilot interface sensor 120 can be a physical device that collects input related to pilot activity and outputs a signal indicative of pilot activity. FIG. 5 shows exemplary pilot interface sensors 120, including yoke 140 (or a sidestick controller if the aircraft uses a sidestick controller instead of yoke 140), throttle controller 144, a plurality of toggle aircraft switches 142, such as an autopilot disconnect button (not expressly shown), a passenger oxygen switch (not expressly shown), engine start/engine stop buttons (not expressly shown), landing gear controls 146, and other controls not expressly shown such as flaps controls, throttle levers, trim controls, radio communication buttons, navigation system controls, emergency buttons, scrolling on a touchscreen, etc. An aircraft cockpit has various pilot interface sensors 120 that need to be physically touched or audibly interfaced with. From the moment the pilot enters the cockpit before a flight until the pilot has left the cockpit after the aircraft has landed, every time the pilot interacts with a pilot interface sensor 120, pilot interface sensor 120 sends an input to pilot workload module 104 informing pilot workload module 104 that the pilot is interacting with that sensor.

Pilot workload module 104 receives inputs from pilot interface sensors 120 and uses the inputs to determine the pilot's current workload. Pilot workload module 104 can generate a pilot workload report. The pilot workload report summarizes the pilot's current workload. Examples of information that can be included in the pilot workload report include actively updating a flight management system (FMS), adjusting pitch using throttle, using radio communication, etc. The pilot workload report can be summarized in any message length including in one word, a couple of words, or several sentences. The pilot workload report can include what tasks the pilot is currently performing. The pilot workload report is sent from pilot workload module 104 to LLM tuning controller 108.

The pilot's workload can vary during a flight. During takeoff and landing, the pilot is very busy operating the controls of the aircraft and the pilot workload report can summarize that the pilot is very busy. During the cruise portion of a flight, the aircraft's autopilot function may be completing most or all of the necessary flight tasks. In these circumstances, the pilot does not have to touch any flight controls. Thus, in these circumstances the pilot workload report can be "pilot is not busy." If the pilot is busy, pilot notification system 100 communicates with the pilot differently than if the pilot is not busy (such as when the pilot is doing nothing and the aircraft's autopilot function is doing all the work).

Pilot workload module 104 can generate an alert based on the inputs that it receives from pilot interface sensors 120. If pilot workload module 104 analyzes the inputs that it receives from pilot interface sensors 120 and determines that there is some information that the pilot needs to be aware of, pilot workload module 104 can include the alert in the pilot workload report. The alert can include information that the pilot needs to be aware of and the urgency of that information. Pilot notification system 100 considers the urgency of the alert when determining the appropriate method of communication with the pilot.

Flight conditions module 106 is a program that accepts inputs from various flight conditions sensors 122, processes those inputs, determines the current flight conditions, generates a flight conditions report, and transmits the flight conditions report to LLM tuning controller 108 (see FIG. 3 for a representation of the steps conducted by flight conditions module 106). Flight conditions module 106 is connected to various flight conditions sensors 122. Flight conditions sensors 122 can be any sensor that inputs information about the current flight conditions. Examples of flight condition sensors are altimeters, angle of attack sensors, pitot tubes, a flight navigation system (which can be used to determine phase of flight), transponders (which can be used to determine other aircraft traffic), etc. Flight conditions sensors 122 input information about the flight conditions and send the information to flight conditions module 106. The flight conditions report is a summary of the current flight conditions. Examples of information that can be included in the flight conditions report are "in cruise phase of flight" or "near other aircraft traffic."

Flight conditions module 106 can generate an alert based on the inputs that it receives from flight conditions sensors 122. If flight conditions module 106 analyzes the inputs that it receives from flight conditions sensors 122 and determines that there is some information that the pilot needs to be aware of, flight conditions module 106 can include an alert in the flight conditions report. The alert can include the information that the pilot needs to be aware of and the urgency of that information. For example, flight conditions module 106 can determine that the aircraft is rapidly losing fuel and generate an alert providing information about the fuel situation to the pilot. Flight conditions module 106 can include in the flight conditions report that the alert is urgent. Pilot notification system 100 considers the urgency of the alert when determining the appropriate method of communication with the pilot. The flight conditions report is important, because it provides pilot notification system 100 information that affects how pilot notification system 100 communicates with the pilot.

LLM tuning controller 108 has two subparts: LLM tuner module 124 and tuning controller alert module 132. LLM tuning controller 108 receives the pilot cognitive state report from pilot cognitive state module 102, the pilot workload report from pilot workload module 104, and the flight conditions report from flight conditions module 106 and provides the three reports to LLM tuner module 124 and tuning controller alert module 132. LLM tuner module 124 includes memory 126, algorithm 128, and AI models 130.

Memory 126 stores a variety of AI algorithms including a copy of LLM 110. Memory 126 is configured to store information and, in some examples, can be described as a computer-readable storage medium. Memory 126, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 126 is a temporary memory. As used herein, a temporary memory refers to a memory having a primary purpose that is not long-term storage. Memory 126, in some examples, is described as volatile memory. As used herein, a volatile memory refers to a memory that that the memory does not maintain stored contents when power to the memory 126 is turned off. Examples of volatile memories can include random access memories (RAM), dynamic random access memories (DRAM), static random access memories (SRAM), and other forms of volatile memories. In some examples, the memory is used to store program instructions for execution by the processor. Memory 126, in one example, is used by LLM tuning controller 108 to temporarily store information during program execution.

Memory 126, in some examples, also includes one or more computer-readable storage media. The storage media can be configured to store larger amounts of information than volatile memory and, further, can be configured for long-term storage of information. In some examples, memory 126 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

Each module in pilot notification system 100 can include a processor. Processors can execute software, applications, and/or programs stored on memory 126. Examples of processors can include one or more of a processor, a microprocessor, a controller, a digital signal processor (DSP), an application specific integrated circuit (ASIC), a field-programmable gate array (FPGA), or other equivalent discrete or integrated logic circuitry. In some examples, the memory is used to store program instructions for execution by the processor.

When LLM tuner module 124 receives the pilot cognitive state report, the pilot workload report, and the flight conditions report, LLM tuner module 124 decides how to modify LLM 110 to tune LLM 110 to generate the appropriate communication for the pilot given the pilot's current cognitive state, the pilot's current workload, and the current flight conditions. For simplicity, the pilot's current cognitive state, the pilot's current workload, and the current flight conditions may also be referred to as "the pilot communication objectives". LLM tuner module 124 has to decide is LLM 110 the appropriate AI algorithm to communicate the pilot communication objectives. In FIGS. 1 and 2, LLM 110 is a large language model, such as a commercially available large language model, a custom-developed large language model, or any other AI algorithm or AI model 130. For the purpose of simplicity, AI models 130 and AI algorithms 130 are used interchangeably hereon.

There are a variety of different types of AI algorithms such as neural networks, large language models, machine learning, deep learning, linear regression, logistic regression, naïve bayes, support vector machines, etc. LLM tuner module 124 can replace LLM 110 with any AI algorithm or AI model 130 that is available in memory 126.

As is known, AI model 130 needs to be "trained" or tuned to accomplish the desired objectives before it can be used a part of the pilot notification system 100. "Training" of AI model 130 can include giving the AI model 130 example data (also called training data) to practice achieving the desired objectives. The training data can be accompanied by correct answers related to the training data. The AI model 130 tests its algorithm using the sample data without seeing the correct answers and then compares the algorithm's calculated results with the correct answers. The AI model 130 is then adjusted to improve the accuracy of its calculated results using different sets of training data. As the AI model 130 receives training with more training data, the AI model's accuracy increases. The AI model 130 is finished training when the AI model 130 demonstrates an accuracy above a chosen threshold. For example, training may be considered complete when the AI model 130 provides correct responses more then 90% of the time (or any other selected training threshold).

All of the AI models 130 stored in memory 126 have undergone some training to be tuned to pilot communication using pilot feedback. During training, AI models 130 were given prompts, such as "The pilot is distracted and tired. Please tell the pilot in a kind tone to increase aircraft altitude to 35,000 feet." Then each AI model 130 within memory 126 generated a message to the pilot. The messages were graded by pilots, and the pilots' grading were used to train the models to learn which responses pilots preferred and which responses pilots disliked. Each AI model 130 had their responses to a variety of prompts graded by pilots. Some AI algorithms could receive better scores on some prompts and worse scores on other prompts. This creates a variety of configurations within each AI model 130. A configuration is a particular structure or set of parameters within an AI model 130. As each AI model 130 tunes to a prompt, each prompt will have a corresponding set of parameters within each AI model 130 that performs most accurately with that prompt. One configuration (also known as one set of parameters) may be the appropriate configuration at responding to the pilot when the pilot is stressed versus another configuration using the same AI model 130 with different parameters may be better at responding to the pilot when the pilot is calm. Thus, within each AI model 130, there are a variety of specific configurations that are tuned to a particular type of prompt. Between all AI models 130, there are going to be a specific or several specific AI models 130 that have a particular configuration that is better suited to responding to a particular type of prompt. A specific configuration within one of AI models 130 could have the highest accuracy among all AI models 130 in response to a specific prompt.

Algorithm 128 categorizes the pilot cognitive state report, the pilot workload report, and the flight conditions report into specific categories. For example, if the combination of the current pilot cognitive state report, pilot workload report, and flight conditions report falls into a category A, the algorithm 128 searches memory 126 to determine which AI model 130 had a specific configuration that performed better during training on this category of reports. Algorithm 128 then chooses that specific AI model 130 in that specific configuration and replaces LLM 110 with the AI model with the configuration that performed better on category A during training. In some examples, a single type of AI model 130 is used and all of the AI models 130 that are stored in memory 126 are variations of the same original AI model 130 with different parameter adjustments within each variation.

Using algorithm 128, AI models 130, memory 126, and LLM 110, allows pilot notification system 100 to adjust the manner in which LLM 110 communicates with the pilot. The combination of algorithm 128, AI models 130, memory 126, and LLM 110 allows the system to communicate with the pilot in the most effective way considering the pilot's current cognitive state, the pilot's current workload, and the current flight conditions. One example of a type of tuning that can be used to adjust LLM 110 to a specific type of prompt is using a combination of weights and matrices. By putting weights on the edges of matrices when performing complex matrix calculations, a Parameter Efficient Fine-Tuning Low-Rank Adaptation (PEFT LoRa) approach as known to persons of ordinary skill in AI can be used to adjust the weights to tune the model to a specific type of prompt. Weights can be adjusted within a neural network as well to tune the neural network to a specific type of prompt.

Pilot notification system 100 is designed to observe and adapt to the pilot's current mental state similar to how a human co-pilot would observe the pilot and then adjust how they communicate with the pilot based on their observations.

Tuning controller alert module 132 operates independently of LLM tuner module 124. Tuning controller alert module 132 determines whether the pilot needs to be alerted of anything, and if so, what is the scope of the alert. Tuning controller alert module 132 receives the pilot cognitive state report, the pilot workload report, and the flight conditions report from pilot cognitive state module 102, pilot workload module 104, and flight conditions module 106. Tuning controller alert module 132 analyzes the pilot cognitive state report, the pilot workload report, and the flight conditions report, and determines if the pilot needs to be alerted of any information, and what is the urgency of the information. For example, if turning controller alert module 132 receives from the three reports the following information: pilot is tired, pilot is distracted, and pilot needs to begin aircraft descent in 30 minutes. Individually, these pieces of information may have not triggered an alert within the three modules, because none of the information individually was deemed particularly urgent. However, in combination, tuning controller alert module 132 can determine that the pilot should be alerted of the information to keep the pilot informed and attentive during flight. Tuning controller alert module 132 can generate an alert that informs the pilot of information that tuning controller alert module 132 determines is important. The alert can include information from the pilot cognitive state report, the pilot workload report, and the flight conditions report. The alert can also include an urgency of the information for the pilot. The urgency can range from not urgent to extremely urgent. Tuning controller alert module 132 sends the alert to preamble module 112.

Tuning controller alert module 132 can receive an alert from each module (also known as module alerts) indicating what information the pilot needs to be aware of and what is the urgency of that information. Tuning controller alert module 132 can consider the module alerts when it determines whether the pilot needs to be alerted of any information. Tuning controller alert module 132 can increase the urgency of its own alert above the level indicated in a module alert when tuning controller alert module 132 considers the reports of the other modules. For example, if pilot cognitive state module 102 reports that the pilot may be falling asleep with a medium level urgency, and then flight conditions module 106 reports that there are other aircraft nearby with a medium level urgency, then tuning controller alert module 132 may determine that the combination of information from pilot cognitive state module 102 and flight conditions module 106 is extremely urgent. Tuning controller alert module 132 includes extremely urgent in its own alert along with the relevant information for the pilot to be aware of and send the alert to preamble module 112.

When a pilot is overwhelmed, an active alarm or other types of notifications can hinder the pilot's ability to think and decrease the pilot's ability to respond effectively to the situation. Pilot workload module 104 allows pilot notification system 100 to consider the pilot's current workload and avoid overwhelming the pilot with information when the pilot is already very busy. If the pilot is very busy and the urgency of an alert is low, pilot notification system 100 can wait to alert the pilot until the pilot is less distracted. If the pilot workload report and the pilot cognitive state report indicate that the pilot is overwhelmed or very busy, tuning controller alert module 132 can wait to send the alert to preamble module 112 until the pilot is less busy. Tuning controller alert module 132 can determine when the pilot is less busy based on the pilot cognitive state report and the pilot workload report (for example, waiting to send an alert until ten seconds after the pilot workload report indicates that the pilot has finished flipping a series of switches).

When the aircraft is below 10,000 feet, pilots are requested to have a sterile cockpit. Sterile cockpit means that the pilots are keeping conversations focused on the flight. When the aircraft is below 10,000 feet, pilots are expected to pay extra attention, which can change their cognitive state from a previous more relaxed state to a focused or agitated cognitive state. This is a scenario where tuning controller alert module 132 (upon receiving these inputs from pilot cognitive state module 102, pilot workload module 104, and flight conditions module 106) may reduce notifications to the pilot so that the pilot can focus on flying the aircraft at the lower altitude. Waiting until the pilot is less busy or less distracted allows pilot notification system 100 to deliver communication to the pilot effectively in terms of timing (when the pilot receives a message). Pilot notification system 100 does not overwhelm the pilot with information when the pilot is unable to consider more information.

Preamble module 112 receives an alert from tuning controller alert module 132. The alert can include information that the pilot needs to be aware of and an urgency of that information. Preamble module 112 generates a prompt for LLM 110. The prompt is a message that tells LLM 110 what to communicate to the pilot. An example prompt may be: "As an AI assistant generate a message to alert the pilot to there needs to be a route change for weather. A thunderstorm is 20NM away. This message is mid-level urgency." Preamble module 112 combines the alert from tuning controller alert module 132 with a preamble to create the prompt. The preamble is an introduction to the alert information. In the above example the preamble was: "As an AI assistant generate a message to alert the pilot to:" and the alert was "there needs to be a route change for weather. A thunderstorm is 20 NM away. This message is mid-level urgency." Preamble module 112 sends the prompt to LLM 110. Preamble module 112 is important, because preamble module 112 converts the alert information into instructions for LLM 110. In some examples, without preamble module 112, LLM 110 would not have clear guidance on what to do with any alert from tuning controller alert module 132 or avionic alert module 116 and LLM 110 may not communicate the alert to the pilot in the most effective manner. In some examples, preamble module 112 can have a variety of preambles saved. Preamble module 112 can use an algorithm to analyze the alert information and choose which preamble is most appropriate for tone of the prompt and urgency of the prompt. In one example, pilot notification system 100 can have no preamble module. In this example, alerts are sent directly from tuning controller alert module 132 to LLM 110.

LLM 110 receives the prompt from preamble module 112. LLM 110 uses the prompt, the large language model tuned through training, and the adjustments to LLM 110 from LLM tuner module 124 to generate a message to the pilot that can consider the pilot's current cognitive state, the pilot's current workload, and the current flight conditions. LLM 110 can create messages that are designed to achieve a particular tone of voice and verbiage that are compatible with the pilot's current cognitive state or mental state. Examples of particular tones of voice that can be input into LLM 110 are urgent tone, relaxed tone, kind tone, and any other tone desired. Due to the nature of AI models, any single word or group of words can be inputted to LLM 110. Different inputs can return completely different outputs, similar outputs, or the exact same output depending on the AI model 130 algorithm and training. The mapping from inputs to outputs is not fixed and is not mutually exclusive. Multiple different inputs can have the same output. As the AI model 130 trains and learns over time, the same input may have a different output every time the input is submitted to the AI model 130. In one example, LLM 110 can be designed to be deterministic such that providing the same input to LLM 110 produces the same output every time. In another example, LLM 110 can be designed to be non-deterministic such that providing the same input to LLM 110 produces a different output at least some of the time. There are benefits to a deterministic AI model. Once LLM 110 has been trained, a deterministic output can provide consistency to the pilot. If a pilot wants the same exact message regardless of current cognitive state or current workload, then a deterministic output would be preferable. If a pilot wants pilot notification system 100 to vary its communication style based on the pilot's current cognitive state or their current workload, then a non-deterministic LLM 110 would be preferable. In another example, LLM 110 can be a non-deterministic AI model. Pilot preferences can range between deterministic or non-deterministic outputs. A pilot can input individual preferences into the system using pre-flight pilot survey 138 or the post-flight pilot survey.

LLM 110 receives the prompt which can include a large amount of technical detail with information relevant to the alert. The amount of information in the prompt can be too much information to present to the pilot directly, so LLM 110 summarizes the large amount of information included in the prompt when creating its message to the pilot. LLM 110 enables the pilot to receive an appropriate amount of relevant information based on the adjustments to LLM 110 made by LLM tuner module 124.

LLM 110 sends the message to pilot communications module 114. pilot communications module 114 presents the message to the pilot. Pilot communications module 114 can include a visual pilot communications module 114 or multiple visual pilot communications modules 114. Examples of visual pilot communications modules 114 are primary pilot communications modules, multi-function displays, electronic flight instrument displays, lcd screens, tablets, etc. Pilot communications module 114 can be anything that communicates information to the pilot. Pilot communications module 114 can display the message to the pilot visually (such as on a screen) or audibly (such as using a sound system).

Pilot notification system 100 operates in real-time during the entire duration of the flight. In one example, pilot notification system 100 does not communicate with outside servers that are not present on the aircraft. In another example, pilot notification system 100 sends the prompt from preamble module 112 to an off site server that is not located on the aircraft where LLM 110 is stored, and LLM 110 generates the message for the pilot and send the message back to pilot notification system 100 in real-time during the flight.

LLM tuner module 124 uses memory 126, algorithm 128, and AI models 130 to adjust LLM 110 depending on the pilot cognitive state report, the pilot workload report, and the flight conditions report. From the moment the pilot enters the cockpit before the flight, during the entire flight, and until the pilot leaves the cockpit after the flight, pilot cognitive state module 102, pilot workload module 104, and flight conditions module 106, are sending new pilot cognitive state reports, pilot workload reports, and flight conditions reports to LLM tuning controller 108. Algorithm 128 analyzes each new pilot cognitive state report, new pilot workload report, and new flight conditions report, categorizes the content of the three reports, searches memory 126 for the appropriate AI model configuration for that category, and replaces LLM 110 with the appropriate configuration for that category. LLM tuner module 124 updates LLM 110 to reflect the pilot's current cognitive state, pilot's current workload, and the current flight conditions independently of all other modules in pilot notification system 100. This means that at all times LLM 110 reflects the appropriate AI model 130 for the pilot's current cognitive state, the pilot's current workload, and the current flight conditions. When preamble module 112 sends a prompt to LLM 110, the pilot message generated by LLM 110 is the appropriate message for the current circumstances, because LLM 110 has already been adjusted for the current circumstances. There is no need to wait for LLM 110 to be adjusted when LLM 110 receives a prompt, because LLM 110 has already been adjusted whenever preamble module 112 gives LLM 110 an input.

In addition to receiving an alert from tuning controller alert module 132, preamble module 112 can receive an alert from avionic alert module 116. Avionic alert module 116 is connected to multiple avionic sensors 134. Avionic alert module 116 sends alerts to preamble module 112 that are generated by sensors other than pilot cognitive state sensors 118, pilot interface sensors 120, or flight conditions sensors 122. Avionic sensors 134 can be any sensor that is not a pilot cognitive state sensor 118, a pilot interface sensor 120, or a flight conditions sensor 122. Examples of avionic sensors 134 can include a radio (that the pilot uses to communicate with air traffic control (ATC)), a weather sensor, airspeed indicators, vertical speed indicators, attitude indicators, heading indicators, tachometers, engine temperature gauges, fuel and oil quantity gauges, pressure gauges, etc. Avionic alert module 116 receives an input from avionic sensors 134 and determines if the pilot needs to be alerted of the input. If avionic alert module 116 determines that the pilot does need to be alerted, avionic alert module 116 generates an alert based on the input received from avionic sensor 134. Avionic alert module 116 transmits the alert to preamble module 112. Preamble module 112 receives the alert from avionic alert module 116, generates a prompt by combining the alert with the preamble, and transmits the alert to LLM 110. LLM 110 processes the alert and generates a message to the pilot using the same steps as described above. LLM 110 transmits the message to pilot communications module 114. Pilot communications module 114 presents the message to the pilot. In one example, pilot notification system 100 can have no avionic alert module. In this example, alerts are only generated in pilot cognitive state module 102, pilot workload module 104, flight conditions module 106, and LLM tuning controller 108.

Pilot notification system 100 can receive an alert from pilot cognitive state module 102, pilot workload module 104, flight conditions module 106, tuning controller alert module 132, and avionic alert module 116. Each of these alerts can be generated simultaneously in pilot notification system 100. Pilot notification system 100 can processes multiple alerts at once and provide all of the alerts to the pilot. These alerts can be provided to the pilot individually in multiple pilot alert messages or these alerts can be combined into a single pilot alert message that is provided to the pilot.

In one example, pilot notification system 100 includes pre-flight pilot survey 138, which is given to the pilot before the flight to give pilot notification system 100 more information about the pilot's communication preferences. Pre-flight pilot survey 138 can be a series of questions displayed on pilot communications module 114. The survey can be any number of questions and can be completely optional. The survey can ask questions such as "what type of tone do you prefer when receiving messages? Do you want information to be presented in a single sentence, a couple of sentences, or in longer passages, or in bullet points? Do you prefer the system inform you of alerts while you are busy or would you prefer the system to wait until you have finished the tasks you are working on?" Pilot input 136 is the pilot's response to the survey questions. After completing pre-flight pilot survey 138, the survey answers are sent to LLM tuning controller 108. LLM tuner module 124 uses the survey results to adjust LLM 110. The survey results are used alongside the pilot cognitive state report, the pilot workload report, and the flight conditions report when LLM tuner module 124 is categorizing the information in the three reports and deciding which AI configuration stored in memory 126 is better suited to the current circumstances. The survey results are used as a factor in determining how to tune LLM 110 during the duration of the flight. The pilot can use pilot communications module 114 to input feedback to pilot notification system 100.

In addition to the pre-flight pilot survey, pilot notification system 100 can receive pilot input 136 during the flight. The pilot can use pilot communications module 114 to input feedback to pilot notification system 100. Pilot communications module 114 can send pilot feedback to LLM tuning controller 108, LLM tuning controller 108 can use the LLM tuner module 124 to incorporate the pilot's feedback into the pilot's communication objectives and determine the appropriate AI algorithm to communicate the pilot communication objectives.

After the flight is over, pilot notification system 100 can ask the pilot an optional post-flight pilot survey. The post-flight pilot survey can include questions, such as "how was your experience using the notification system? Did you experience any communication issues with the system? Are there any ways the system's communication could improve?" The results of pre-flight pilot survey 138, feedback during the flight, and the post-flight survey can be used for further training for all AI models 130 within pilot notification system 100. The pre-flight pilot survey results, pilot feedback during the flight, and the post-flight pilot survey results can be saved in memory 126.

Pilot notification system 100 considers the current circumstances (such as the pilot's cognitive state, the pilot's workload, and the current flight conditions) when it communicates with the pilot. If the pilot looks stressed and is behaving abnormally, pilot notification system 100 communicates with the pilot differently than if the pilot is calm and focused. Pilot notification system 100's responsiveness to the current circumstances improves communication between the pilot and pilot notification system 100. Improved communication leads to more effective decision making by the pilot, due to spending less time determining what the system is trying to say (for example, the pilot spending time trying to understand why a light is flashing or an alarm is beeping). Improved communication also leads to a safer flight because pilots are able to trust that pilot notification system 100 is able to communicate with them in a way that the pilot understands. Pilot notification system 100 increases the effectiveness of pilot communication, decreasing the frequency of misunderstandings when sensors alert the pilot, and decreasing the time it takes for the pilot to understand an alert. By altering the words, tone, urgency, and timing with which the message is delivered, pilot notification system 100 can provide effective communication to the pilot considering the current circumstances. Pilot notification system 100 enhances the pilot's ability to react to data that is presented from the notification system and helps the data get the proper amount of attention that it deserves. Pilot notification system 100 accomplishes these objectives by providing the right amount of data and summary to make the data most useable by the pilot, so that the pilot feels prepared and supported to fly the aircraft as a single pilot without a decrease in safety compared to a two pilot crew. Pilot notification system 100 contributes to the ability of a single pilot to operate the aircraft as well as a two pilot crew.

While the pilot notification system 100 may typically be used for an aircraft with a pilot onboard, in an alternate embodiment, pilot notification system 100 can be used while operating an uncrewed aerial vehicle (UAV) (such as a drone or remote aircraft). In the context of a UAV, pilot notification system 100 can be interfaced with the primary device used to operate the UAV (such as a controller, a tablet, a computer, etc.) The primary device can be interfaced with pilot notification system 100, by downloading the software for pilot notification system 100 onto the primary device or the software for pilot notification system 100 can be remotely accessed from the primary device. The sensors accessible by the UAV can be categorized as avionic sensors 134 or flight conditions sensors 122 and operate as described above in pilot notification system 100. Pilot cognitive state sensors 118, such as a camera with facial recognition capabilities, can be used to input data to pilot cognitive state module 102. The sensors within the primary device can be used to input information to pilot workload module 104. The rest of pilot notification system 100 can function as described above in FIG. 2. Pilot notification system 100 provides the same benefits to the operator of a UAV that are provided to a pilot in an aircraft. Pilot notification system 100 improves the communication capabilities of the primary device to increase the safety of operating a UAV. In another embodiment, pilot notification system 100 can be used in any vehicle including cars, trucks, aircraft, etc. Pilot notification system 100 will connect to the vehicle's sensors and operate in the same manner described above to improve communication between the vehicle and the pilot.

Discussion of Possible Embodiments

The following are non-exclusive descriptions of possible embodiments of the present invention.

A pilot notification system that includes a plurality of pilot cognitive state sensors, a plurality of pilot interface sensors, a plurality of flight conditions sensors, a pilot cognitive state module configured to receive pilot cognitive state sensor input from the plurality of pilot cognitive state sensors, a pilot workload module configured to receive pilot interface sensor input from the plurality of pilot interface sensors, a flight conditions module configured to receive flight conditions sensor input from the plurality of flight conditions sensors, a large language model (LLM) Tuning Controller, and the LLM. The pilot cognitive state module processes the pilot cognitive state sensor input to determine a cognitive state of the pilot, generates a pilot cognitive state report that reflects the cognitive state of the pilot, and transmits the pilot cognitive state report to the LLM Tuning Controller. The pilot workload module processes the pilot interface sensor input to determine pilot workload, generates a pilot workload report that reflects pilot workload, and transmits the pilot workload report to the LLM Tuning Controller. The flight conditions module processes the flight conditions sensor input to determine flight conditions of the aircraft, generates a flight conditions report, and transmit the flight conditions report to the LLM Tuning Controller. The LLM Tuning Controller includes a LLM Tuner Module and a Tuning Controller Alert Module. The LLM Tuning Controller is configured to receive the pilot cognitive state report, the pilot workload report, and the flight conditions report. The LLM Tuning Controller causes the LLM Tuner Module to generate a set of tuning modifications based on the pilot cognitive state report, the pilot workload report, and the flight conditions report. The set of tuning modifications cause the LLM Tuner Module to modify the current structure of the LLM to reflect the pilot cognitive state report, the pilot workload report, and the flight conditions report. The LLM Tuning Controller is further configured to cause the Tuning Controller Alert Module to generate a tuning controller alert based on at least one of the pilot cognitive state report, the pilot workload report, the flight conditions report and transmit the tuning controller alert to the LLM. The LLM is configured to receive the tuning controller alert, generates a pilot alert message based on the tuning controller alert, and transmits the pilot alert message to a pilot communications module to present the pilot alert message to a pilot. The LLM generates the pilot alert message using the tuning controller alert and an artificial intelligence algorithm that resides in the LLM. The artificial intelligence algorithm has been adjusted using the set of tuning modifications.

The pilot notification system of the preceding paragraph can optionally include, additionally and/or alternatively, any one or more of the following features, configurations and/or additional components:

A further embodiment of the foregoing pilot notification system, further comprising a preamble module. The preamble module is configured to receive the tuning controller alert from the Tuning Controller Alert Module, generate a prompt based on the tuning controller alert, and transmit the prompt to the LLM. The prompt includes a preamble and the tuning controller alert. The LLM is configured to receive the prompt, generate a pilot alert message based on the prompt, and transmit the pilot alert message to a pilot communications module to present the pilot alert message to a pilot. The LLM generates the pilot alert message using the prompt and an artificial intelligence algorithm that resides in the LLM. The artificial intelligence algorithm has been adjusted using the set of tuning modifications.

A further embodiment of any of the foregoing pilot notification systems, further comprising a plurality of avionic sensors and an avionic alert module configured to receive and process avionic sensor input from the plurality of avionic sensors. The avionic alert module determines whether the avionic sensor input is indicative of an avionics alert condition that should be communicated to the pilot. The avionic alert module sends an avionic alert to the preamble module. The preamble module is further configured to receive the avionic alert from the avionic alert module, generate an avionics alert prompt, and transmit the avionics alert prompt to the LLM. The LLM is further configured to receive the avionics alert prompt, generate an avionics alert message based on the avionics alert prompt, and transmit the avionics alert message to the pilot communications module to present the avionics alert message to the pilot.

A further embodiment of any of the foregoing pilot notification systems, further comprising a pre-flight pilot survey module configured to receive preference data from the pilot and transmit the preference data to the LLM Tuning Controller. The LLM Tuning Controller is further configured to use the preference data when generating the pilot alert message.

A further embodiment of any of the foregoing pilot notification systems, wherein the system is configured to interact with the pilot on board the aircraft and receive pilot feedback during the flight.

A further embodiment of any of the foregoing pilot notification systems, further comprising a post-flight pilot survey module configured to receive preference data from the pilot and transmit the preference data to the LLM Tuning Controller, wherein the LLM Tuning Controller is further configured to use the preference data when generating the pilot alert message.

A further embodiment of any of the foregoing pilot notification systems, wherein the system is configured to interact with the pilot, the pilot is located remote from the aircraft, and the pilot cognitive state sensors are located remotely with the pilot and not on board the aircraft.

A further embodiment of any of the foregoing pilot notification systems, wherein at least one pilot cognitive sensor of the plurality of pilot cognitive sensors includes a camera that captures the pilot's face.

A further embodiment of any of the foregoing pilot notification systems, wherein at least one pilot interface sensor of the plurality of pilot interface sensors is connected to a toggle aircraft switch such that the pilot interface sensor determines when the toggle aircraft switch is switched.

A further embodiment of any of the foregoing pilot notification systems, wherein the LLM Tuner Module can replace the LLM with a different artificial intelligence algorithm that is better suited to reflect the set of information in the pilot cognitive state report and the flight conditions report.

A method of operating a pilot notification system, includes receiving a pilot observation sensor input to a pilot observation sensor configured to collect data about a pilot from observing the pilot, transmitting the pilot observation sensor input to a pilot cognitive state module, analyzing the pilot observation sensor input using the pilot cognitive state module to generate a pilot cognitive state report that summarizes the cognitive state of the pilot, transmitting the pilot cognitive state report from the pilot cognitive state module to a LLM Tuning Controller, receiving a flight conditions sensor input to a flight conditions sensor configured to collect data about the environment external to the aircraft and data about the flight conditions of an aircraft, transmitting the flight conditions sensor input to a flight conditions module configured to analyze the flight condition input to determine a set of important flight condition information, analyzing the flight conditions sensor input using the flight conditions module to determine the set of important flight condition information and generate a flight conditions report using the set of important flight condition information, transmitting the flight conditions report from the flight conditions module to the LLM Tuning Controller, receiving the pilot cognitive state report and the flight conditions report in the LLM Tuning Controller, generating a set of tuning modifications in the LLM Tuner Module based on the pilot cognitive state report and the flight conditions report, generating a tuning controller alert in the Tuning Alert Module based on at least one of the pilot cognitive state report or the flight conditions report, transmitting the tuning controller alert from the Tuning Alert Module to the LLM, receiving the tuning controller alert in the LLM, generating a message in the LLM using the tuning controller alert and an artificial intelligence algorithm, transmitting the message from the LLM to a pilot communications module, and displaying the message to a pilot using the pilot communications module. The pilot observation sensor input is any input to the pilot observation sensor. The pilot cognitive state module is a computer program configured to analyze the pilot observation sensor input to determine a cognitive state of the pilot. The pilot's cognitive state includes a mental state of the pilot. The pilot cognitive state report includes a first signal to notify the pilot of the pilot cognitive state report. The flight conditions sensor input is any input to the flight conditions sensor. The flight conditions report includes a second signal to notify the pilot of the flight condition report. The set of tuning modifications cause the LLM Tuner Module to modify the current structure of the LLM to reflect the pilot cognitive state report and the flight conditions report. The artificial intelligence algorithm has been adjusted using the set of tuning instructions.

The method of the preceding paragraph can optionally include, additionally and/or alternatively, any one or more of the following features, configurations and/or additional components:

A further embodiment of the foregoing method, further comprises transmitting the tuning controller alert from the Tuning Alert Module to a preamble module, receiving the tuning controller alert in the preamble module, generating a prompt in the preamble module, transmitting the prompt from the preamble module to the LLM, receiving the prompt in the LLM, and generating a message in the LLM using the prompt and an artificial intelligence algorithm. The prompt includes a preamble and the tuning controller alert. The preamble module gives the LLM instructions.

A further embodiment of any of the foregoing methods, further comprises receiving a pilot interface sensor input from a pilot interface sensor and transmitting the pilot interface sensor input to a pilot workload module configured to determine the pilot workload, analyzing the pilot observation sensor input using the pilot workload module to generate a pilot workload state report that summarizes the pilot workload, and transmitting the pilot workload report from the pilot workload module to the LLM Tuning Controller. The LLM Tuning Controller also uses the pilot workload report to generate the set of tuning modifications.

A further embodiment of any of the foregoing methods, further comprises receiving an avionic alert that is not presented by the LLM Tuning Controller, transmitting the avionic alert to the preamble module, receiving the avionic alert in the preamble module, generating a new prompt in the preamble module that includes the preamble and the avionic alert, transmitting the new prompt from the preamble module to the LLM, receiving the new prompt in the LLM, generating a message in the LLM, transmitting the message from the LLM to a pilot communications module, and displaying the message to a pilot using the pilot communications module. The message is generated using the prompt and an artificial intelligence algorithm. The artificial intelligence algorithm has been adjusted using the set of tuning instructions.

A further embodiment of any of the foregoing methods, further comprises generating a pre-flight pilot survey that receives preference data from the pilot and transmitting the preference data to the LLM Tuning Controller. The LLM Tuning Controller also uses the preference data to generate the set of tuning modifications.

A further embodiment of any of the foregoing methods, wherein the pilot communications module displays the message visually to the pilot.

A further embodiment of any of the foregoing methods, wherein the pilot communications module displays the message audibly to the pilot.

A further embodiment of any of the foregoing methods, wherein the tuning controller alert includes data about how urgently the pilot needs to respond to the tuning controller alert.

A further embodiment of any of the foregoing methods, further comprising training the LLM using a training set.

A further embodiment of any of the foregoing methods, wherein the LLM Tuner Module can replace the LLM with a different artificial intelligence algorithm that is better suited to reflect the set of information in the pilot cognitive state report and the flight conditions report.

Any relative terms or terms of degree used herein, such as "substantially", "essentially "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pilot notification system comprising:
a plurality of pilot cognitive state sensors;
a plurality of pilot interface sensors;
a plurality of flight conditions sensors;
a pilot cognitive state module configured to receive pilot cognitive state sensor input from the plurality of pilot cognitive state sensors,
wherein the pilot cognitive state module processes the pilot cognitive state sensor input to determine a cognitive state of the pilot, generates a pilot cognitive state report that reflects the cognitive state of the pilot, and transmits the pilot cognitive state report to a large language model (LLM) Tuning Controller;
a pilot workload module configured to receive pilot interface sensor input from the plurality of pilot interface sensors, wherein the plurality of pilot interface sensors are configured to be physically touched by the pilot and audibly interfaced with by the pilot and wherein the plurality of pilot interface sensors are further configured to send the pilot interface sensor input to the pilot workload module,
wherein the pilot workload module processes the pilot interface sensor input to determine pilot workload, generates a pilot workload report that reflects pilot workload, and transmits the pilot workload report to the LLM Tuning Controller;
a flight conditions module configured to receive flight conditions sensor input from the plurality of fight conditions sensors,
wherein the flight conditions module processes the flight conditions sensor input to determine flight conditions of the aircraft, generates a flight conditions report, and transmit the flight conditions report to the LLM Tuning Controller;
wherein the LLM Tuning Controller includes a LLM Tuner Module and a Tuning Controller Alert Module;
wherein the LLM Tuning Controller is configured to receive the pilot cognitive state report, the pilot workload report, and the flight conditions report and to cause the LLM Tuner Module to:
generate a set of tuning modifications based on the pilot cognitive state report, the pilot workload report, and the flight conditions report, wherein the set of tuning modifications cause the LLM Tuner Module to modify the current structure of a LLM to reflect the pilot cognitive state report, the pilot workload report, and the flight conditions report;
wherein the LLM Tuning Controller is further configured to cause the Tuning Controller Alert Module to:
generate a tuning controller alert based on at least one of the pilot cognitive state report, the pilot workload report, the flight conditions report;
transmit the tuning controller alert to the LLM;
wherein the LLM is configured to receive the tuning controller alert, generates a pilot alert message based on the tuning controller alert, and transmits the pilot alert message to a pilot communications module to present the pilot alert message to a pilot,
wherein the LLM generates the pilot alert message using the tuning controller alert and an artificial intelligence algorithm that resides in the LLM; and
wherein the artificial intelligence algorithm has been adjusted using the set of tuning modifications.

2. The pilot notification system of claim 1 further comprising:
a preamble module, wherein the preamble module is configured to receive the tuning controller alert from the Tuning Controller Alert Module, generate a prompt based on the tuning controller alert, and transmit the prompt to the LLM,
wherein the prompt includes a preamble and the tuning controller alert; wherein the LLM is configured to receive the prompt, generate a pilot alert message based on the prompt, and transmits the pilot alert message to a pilot communications module to present the pilot alert message to a pilot,
wherein the LLM generates the pilot alert message using the prompt and an artificial intelligence algorithm that resides in the LLM; and
wherein the artificial intelligence algorithm has been adjusted using the set of tuning modifications.

3. The pilot notification system of claim 1 further comprising: a plurality of avionic sensors;
an avionic alert module configured to receive and process avionic sensor input from the plurality of avionic sensors,
wherein the avionic alert module determines whether the avionic sensor input is indicative of an avionics alert condition that should be communicated to the pilot; and
wherein the avionic alert module sends an avionic alert to the preamble module;
wherein the preamble module is further configured to receive the avionic alert from the avionic alert module, generate an avionics alert prompt, and transmit the avionics alert prompt to the LLM;
wherein the LLM is further configured to receive the avionics alert prompt, generate an avionics alert message based on the avionics alert prompt, and transmits the avionics alert message to the pilot communications module to present the avionics alert message to the pilot.

4. The pilot notification system of claim 1 further comprising a pre-flight pilot survey module configured to receive preference data from the pilot and transmit the preference data to the LLM Tuning Controller, wherein the LLM Tuning Controller is further configured to use the preference data when generating the pilot alert message.

5. The pilot notification system of claim 1, wherein the system is configured to interact with the pilot on board the aircraft and receive pilot feedback during the flight.

6. The pilot notification system of claim 1 further comprising a post-flight pilot survey module configured to receive preference data from the pilot and transmit the preference data to the LLM Tuning Controller, wherein the LLM Tuning Controller is further configured to use the preference data when generating the pilot alert message.

7. The pilot notification system of claim 1, wherein the system is configured to interact with the pilot, the pilot is located remote from the aircraft, and the pilot cognitive state sensors are located remotely with the pilot and not on board the aircraft.

8. The pilot notification system of claim 1, wherein at least one pilot cognitive sensor of the plurality of pilot cognitive sensors includes a camera that captures the pilot's face.

9. The pilot notification system of claim 1, wherein at least one pilot interface sensor of the plurality of pilot interface sensors is connected to a toggle aircraft switch such that the pilot interface sensor determines when the toggle aircraft switch is switched.

10. The pilot notification system of claim 1, wherein the LLM Tuner Module can replace the LLM with a different artificial intelligence algorithm that is better suited to reflect the set of information in the pilot cognitive state report and the flight conditions report.

11. A method of operating a pilot notification system comprising:

receiving a pilot observation sensor input to a pilot observation sensor configured to collect data about a pilot from observing the pilot; and wherein the pilot observation sensor input is any input to the pilot observation sensor;

transmitting the pilot observation sensor input to a pilot cognitive state module, wherein the pilot cognitive state module is a computer program configured to analyze the pilot observation sensor input to determine a cognitive state of the pilot; and wherein the pilot's cognitive state includes a mental state of the pilot;

analyzing the pilot observation sensor input using the pilot cognitive state module to generate a pilot cognitive state report that summarizes the cognitive state of the pilot; and wherein the pilot cognitive state report includes a first signal to notify the pilot of the pilot cognitive state report;

transmitting the pilot cognitive state report from the pilot cognitive state module to a LLM Tuning Controller;

receiving a pilot interface sensor input from a plurality of pilot interface sensors and transmitting the pilot interface sensor input to a pilot workload module configured to determine the pilot workload, wherein the plurality of pilot interface sensors are configured to be physically touched by the pilot and audibly interfaced with by the pilot and wherein the plurality of pilot interface sensors are further configured to send the pilot interface sensor input to the pilot workload module;

analyzing the pilot observation sensor input using the pilot workload module to generate a pilot workload state report that summarizes the pilot workload; and transmitting the pilot workload report from the pilot workload module to the LLM Tuning Controller;

wherein the LLM Tuning Controller also uses the pilot workload report to generate the set of tuning modifications;

receiving a flight conditions sensor input to a flight conditions sensor configured to collect data about the environment external to the aircraft and data about the flight conditions of an aircraft; and wherein the flight conditions sensor input is any input to the flight conditions sensor;

transmitting the flight conditions sensor input to a flight conditions module configured to analyze the flight condition input to determine a set of important flight condition information; and analyzing the flight conditions sensor input using the flight conditions module to determine the set of important flight condition information and generate a flight conditions report using the set of important flight condition information and wherein the flight conditions report includes a second signal to notify the pilot of the flight condition report;

transmitting the flight conditions report from the flight conditions module to the LLM Tuning Controller;

receiving the pilot cognitive state report and the flight conditions report in the LLM Tuning Controller;

generating a set of tuning modifications in the LLM Tuner Module based on the pilot cognitive state report and the flight conditions report, wherein the set of tuning modifications cause the LLM Tuner Module to modify the current structure of a LLM to reflect the pilot cognitive state report and the flight conditions report;

generating a tuning controller alert in the Tuning Alert Module based on at least one of the pilot cognitive state report or the flight conditions report;

transmitting the tuning controller alert from the Tuning Alert Module to the large language model;

receiving the tuning controller alert in the LLM;

generating a message in the LLM using the tuning controller alert and an artificial intelligence algorithm, wherein the artificial intelligence algorithm has been adjusted using the set of tuning instructions;

transmitting the message from the LLM to a pilot communications module; and displaying the message to a pilot using the pilot communications module.

12. The method of operating a pilot notification system of claim 11 that further comprises:

transmitting the tuning controller alert from the Tuning Alert Module to a preamble module;

receiving the tuning controller alert in the preamble module; generating a prompt in the preamble module, wherein the prompt includes a preamble and the tuning controller alert; and wherein the preamble module gives the LLM instructions;

transmitting the prompt from the preamble module to the LLM;

receiving the prompt in the LLM;

generating a message in the LLM using the prompt and an artificial intelligence algorithm.

13. The method of operating a pilot notification system of claim 11 that further comprises:

receiving an avionic alert that is not presented by the LLM Tuning Controller; and transmitting the avionic alert to the preamble module;

receiving the avionic alert in the preamble module; generating a new prompt in the preamble module that includes the preamble and the avionic alert;

transmitting the new prompt from the preamble module to the LLM;

receiving the new prompt in the LLM;

generating a message in the LLM, wherein the message is generated using the prompt and the artificial intelligence algorithm; and wherein the artificial intelligence algorithm has been adjusted using the set of tuning instructions;

transmitting the message from the large language model to a pilot communications module; and displaying the message to a pilot using the pilot communications module.

14. The method of operating a pilot notification system of claim 11 that further comprises: generating a pre-flight pilot survey that receives preference data from the pilot; and transmitting the preference data to the LLM Tuning Controller, wherein the LLM Tuning Controller also uses the preference data to generate the set of tuning modifications.

15. The method of operating a pilot notification system of claim 11 wherein the pilot communications module displays the message visually to the pilot.

16. The method of operating a pilot notification system of claim 11 wherein the pilot communications module displays the message audibly to the pilot.

17. The method of operating a pilot notification system of claim 11 wherein the tuning controller alert includes data about how urgently the pilot needs to respond to the tuning controller alert.

18. The method of operating a pilot notification system of claim 11 further comprising training the large language model using a training set.

19. The method of operating a pilot notification system of claim 11 wherein the LLM Tuner Module can replace the large language model with a different artificial intelligence algorithm that is better suited to reflect the set of information in the pilot cognitive state report and the flight conditions report.

20. The method of operating a pilot notification system of claim 11, wherein the system is configured to interact with the pilot, the pilot is located remote from the aircraft, and the pilot cognitive state sensors are located remotely with the pilot and not on board the aircraft.

* * * * *